(12) United States Patent
Yoshihiro et al.

(10) Patent No.: US 7,058,283 B2
(45) Date of Patent: Jun. 6, 2006

(54) MAGNETIC TAPE TRACKING CONTROL APPARATUS AND METHOD, MAGNETIC TAPE FORMAT, RECORDING MEDIUM AND PROGRAM

(75) Inventors: Toshitaka Yoshihiro, Kanagawa (JP); Fumiyoshi Abe, Kanagawa (JP)

(73) Assignee: Sony Corporation (JP)

( * ) Notice: Subject to any disclaimer, the term of this patent is extended or adjusted under 35 U.S.C. 154(b) by 1154 days.

(21) Appl. No.: 09/864,336

(22) Filed: May 25, 2001

(65) Prior Publication Data

US 2002/0001451 A1 Jan. 3, 2002

(30) Foreign Application Priority Data

Jun. 8, 2000 (JP) ............................ P2000-171576
Jan. 19, 2001 (JP) ............................ P2001-011750

(51) Int. Cl.
*H04N 5/93* (2006.01)

(52) U.S. Cl. .............................. 386/78; 386/79; 386/81

(58) Field of Classification Search .................. 386/68, 386/111, 6–8, 81, 109, 78, 80, 79
See application file for complete search history.

(56) References Cited

U.S. PATENT DOCUMENTS 5,740,307 A * 4/1998 Lane ............................ 386/68
6,539,165 B1 * 3/2003 Rijckaert et al. ............. 386/78
2001/0041055 A1 * 11/2001 Kawamura et al. ........... 386/95

FOREIGN PATENT DOCUMENTS

EP 0 0 618 567 A2 10/1994
EP 0 701 380 A2 3/1996
WO WO 98/34228 8/1998

OTHER PUBLICATIONS

European Search Report and Annex dated Feb. 20, 2004.
Onishi K, et al. "Trick Play Method for Digital VCRs" Electronics & Communications in Japan, Part III—Fundamental Electronic Science, Scripta Technical, New York, US, vol. 80, No. 12, Dec. 1, 1997, pp. 65-80.

* cited by examiner

*Primary Examiner*—Robert Chevalier
*Assistant Examiner*—Helen Shibru
(74) *Attorney, Agent, or Firm*—Rader, Fishman & Grauer PLLC; Ronald P. Kananen

(57) ABSTRACT

Magnetic tape tracking control apparatus and method, magnetic tape format, recording medium and program for controlling tracking of tracks on a magnetic tape by a rotary head are disclosed. The magnetic tape tracking control apparatus comprises a first generating element for encoding an inputted video signal to generate the video data, a second generating element for generating search video data on the basis of the video data generated by the first generating element and a recording element for recording, on the tracks, the video data generated by the first generating element, the search video data generated by second generating element and positional information associated with a recording position of the search video data.

4 Claims, 16 Drawing Sheets

FIG.5

| ID0 | | | | | | | | ID1 | ID2 | SB HEADER (1BYTES) | DATA (95BYTES) |
|---|---|---|---|---|---|---|---|---|---|---|---|
| b7 | b6 | b5 | b4 | b3 | b2 | b1 | b0 | | | | |
| F_TYPE | | | TRACK PAIR NUMBER (0-63) | | | | | SYNC BLOCK NUMBER (0-140) | OVERWRITE PROTECT | SB HEADER | DATA |
| F_TYPE (E) | | | TRACK PAIR NUMBER (0-63) | | | | | SYNC BLOCK NUMBER (0-140) | OVERWRITE PROTECT | SB HEADER | DATA |

FIG. 6

P/F : PARTIAL/FULL
V/A : VIDEO/AUDIO

| MAIN DATA TYPE | | | CONTENTS | | | | |
|---|---|---|---|---|---|---|---|
| b7 | b6 | b5 | b4 | b3 | b2 | b1 | b0 |
| 0 | | PES-VIDEO | F/P | CONTINUITY COUNTER | | | |
| 1 | | PES-AUDIO | F/P | CONTINUITY COUNTER | | | |
| 2 | | SEARCH | V/A | SEARCH SPEED | | | RES |
| 3 | | AUX | AUX MODE | | | RESERVED | |
| 4 | | TS-1H | JUMP FLAG | TIME STAMP | | | |
| 5 | | TS-2H | CONTINUITY COUNTER | | | | |
| 6 | | NULL | RESERVED | | | | |
| 7 | | RESERVED | RESERVED | | | | |

SEARCH SPEED

0 : RESERVED
1 : 4-FOLD SPEED
2 : 8-FOLD SPEED
3 : 16-FOLD SPEED
4 : 24-FOLD SPEED
5 : 32-FOLD SPEED
6–7 : RESERVED

FIG. 9

| ID0 | | ID1 | | ID2 |
|---|---|---|---|---|
| b7-b5 | b4-b0 | b7-b4 | b3-b0 | |
| F_TYPE | TRACK PAIR NUMBER (0-31) | RESERVED | SB NUMBER (0) | OVERWRITE PROTECT |
| F_TYPE | TRACK PAIR NUMBER (0-31) | RESERVED | SB NUMBER (1) | OVERWRITE PROTECT |
| F_TYPE | TRACK PAIR NUMBER (0-31) | RESERVED | SB NUMBER (2) | OVERWRITE PROTECT |
| F_TYPE | TRACK PAIR NUMBER (0-31) | RESERVED | SB NUMBER (3) | OVERWRITE PROTECT |
| F_TYPE | TRACK PAIR NUMBER (0-31) | RESERVED | SB NUMBER (4) | OVERWRITE PROTECT |
| F_TYPE | TRACK PAIR NUMBER (0-31) | RESERVED | SB NUMBER (5) | OVERWRITE PROTECT |
| F_TYPE | TRACK PAIR NUMBER (0-31) | RESERVED | SB NUMBER (6) | OVERWRITE PROTECT |
| F_TYPE | TRACK PAIR NUMBER (0-31) | RESERVED | SB NUMBER (7) | OVERWRITE PROTECT |
| F_TYPE | TRACK PAIR NUMBER (0-31) | RESERVED | SB NUMBER (8) | OVERWRITE PROTECT |
| F_TYPE | TRACK PAIR NUMBER (0-31) | RESERVED | SB NUMBER (9) | OVERWRITE PROTECT |

FIG. 10A

USER TAPE

| 1 | ATNF (ATN+FLG) |
|---|---|
| 2 | TTC |
| 3 | REC DATE |
| 4 | REC TIME |
| 5 | ATNF (ATN+FLG) |
| 6 | TTC |
| 7 | REC DATE |
| 8 | REC TIME |
| 9 | ATNF (ATN+FLG) |
| 10 | TTC |

FIG. 10B

PRE REC TAPE

| 1 | ATNF (ATN+FLG) |
|---|---|
| 2 | TTC |
| 3 | PART NUMBER |
| 4 | CHAPTER START |
| 5 | ATNF (ATN+FLG) |
| 6 | TTC |
| 7 | PART NUMBER |
| 8 | CHAPTER START |
| 9 | ATNF (ATN+FLG) |
| 10 | TTC |

FIG. 11

| BIT | FLG | CONTENTS |
|-----|-----|----------|
| b7 | I | INDEX ID |
| b6 | — | RESERVED |
| b5 | P | PP ID (STILL/MOTION PICTURE CHANGE POINT) |
| b4 | EH | EDIT HEADER ECC BLOCK IS HERE |
| b3 | ← | |
| b2 | EPO | EDIT PICTURE HEADER OFFSET (0-15) |
| b1 | | |
| b0 | → | |

FIG. 12

| bit | b7 | b6 | b5 | b4 | b3 | b2 | b1 | b0 |
|---|---|---|---|---|---|---|---|---|
| D1 | S2 | S1 | f11 | f10 | f3 | f2 | f1 | f0 |
| D2 | S3 | s12 | s11 | s10 | s3 | s2 | s1 | s0 |
| D3 | S4 | m12 | m11 | m10 | m3 | m2 | m1 | m0 |
| D4 | S6 | S5 | h11 | h10 | h3 | h2 | h1 | h0 |

MAGNETIC TAPE TRACKING CONTROL APPARATUS AND METHOD, MAGNETIC TAPE FORMAT, RECORDING MEDIUM AND PROGRAM

BACKGROUND OF THE INVENTION

The present invention relates to a magnetic tape tracking control apparatus and method, a magnetic tape format, a recording medium and a program. More particularly, the present invention relates to a magnetic tape tracking control apparatus and method, a magnetic tape format, a recording medium and a program for securely capturing data at variable-speed reproduction to display good images.

Recently, the technologies for recording image and audio data after compressing have been making considerable progress. Highly efficient compressing algorithms include the MPEG (Moving Picture Experts Group) standard for example.

For example, in conventional recording devices, such as VTR (Video Tape Recorder), which record image and audio data onto a magnetic tape by use of the MPEG standard, in order to enable variable-speed reproduction (or so-called search reproduction) at other than normal reproduction speeds, search image data is recorded at a position which allows the rotary head to trace at the time of search reproduction.

When search reproduction is executed at a predetermine speed, the search image data is read from the magnetic tape and a search image is displayed on the screen.

In implementing the search capability of recording and reproducing devices, it is desirable to set the value of the high-speed reproduction speed to 24 (a speed at which images are displayed every 2 seconds of normal reproduction speed) in view of the number of update frames (namely, the number of search frames or an image interval) and the quick view time of one roll of magnetic tape.

In the case of 24-fold reproduction, reproduction is executed every 3 ECCs (Error Correcting Codes) (every 48 tracks because 1 ECC block consists of 16 tracks), thereby requiring an optimum tracking system.

In order to implement reliable phase locking, it is desirable to record recording phase information (namely, the value a modulo-3 counter in a unit of ECC or the value of a modulo-48 counter in unit of track) to every sync block. However, this presents a problem that the bit allocation is restricted and, therefore, an increase in the bits of ID, for example, lowers the total efficiency.

It may be possible to record search data repeatedly and lock the phase to one of patterns (in unit of ECC). However, this presents a problem of increasing the volume of the search data 3 times, thereby squeezing the rate of the main video to affect picture quality adversely .

Also, a scheme has been proposed in which tracking information is recorded in the control track formed along the length of magnetic tape. However, this presents the problem of increased cost, thereby making it impracticable for consumer-use DV (Digital Video) formats.

SUMMARY OF THE INVENTION

It is therefore an object of the present invention to provide a magnetic tape tracking control apparatus and method, magnetic tape format, recording medium and program for the reliable tracking at variable-speed reproduction while recording the recording positional information of search data to a subcode separated from the search data.

According to the first aspect of the present invention, there is provided a magnetic tape tracking control apparatus for controlling the tracking of tracks on a magnetic tape by a rotary head, comprising a first generating means for encoding an inputted video signal to generate the video data, a second generating means for generating search video data on the basis of the video data generated by the first generating means and a recording means for recording on the tracks the video data generated by the first generating means, the search video data generated by second generating means and the positional information associated with the recording position of the search video data.

The recording means may record the video data in a unit of a sync block having a predetermined length and the positional information to a sync block which is different from a position of the search video data.

The recording means may record the positional information to a subcode.

Preferably, the magnetic tape tracking control apparatus may further comprise a first generating means for generating a first number corresponding to a position of the tracks, a second generating means for generating a second number corresponding to a position of one of the tracks, recorded with the search video data and a comparing means for comparing the first number with the second number to control tracking on the basis of a result of the comparison.

The second generating means may further comprise a counting means for counting clocks, a detecting means for detecting a track recorded with the search video data and a first setting means for setting a count value of the counting means on the basis of a detection result outputted from the detecting means.

The rotary head may further comprise a first head capable of reproducing the search video data and a second head incapable of reproduction. The second generating means may further comprise a second setting means for setting a count value of the counting means on the basis of information reproduced from the magnetic tape through the second head.

The second generating means further comprise a second setting means for setting, on the basis of the count value of the counting means and reproduced information from the track recorded with the search video data, the count value of the counting means.

The reproduced information from the track recorded with the search video data may be reproduced information that is obtained when the count value of the counting means is a value which corresponds to the track recorded with the search video data.

The reproduced information from the track recorded with the search video data may be a number recorded on the track, and the second setting means may set the count value of the counting means on the basis of a difference between the count value of the counting means and the number.

According to the second aspect of the present invention, there is provided a magnetic tape tracking control method for a magnetic tape tracking control apparatus for controlling the tracking of tracks on a magnetic tape by a rotary head, comprising a first generating step for encoding an inputted video signal to generate the video data, a second generating step for generating search video data on the basis of the video data generated in the first generating step and a recording step for recording on the tracks the video data generated in the first generating step, the search video data generated in second generating step and the positional information associated with a recording position of the search video data.

According to the third aspect of the present invention, there is a recording medium storing a computer-readable program for a magnetic tape tracking control apparatus for controlling the tracking of tracks on a magnetic tape by a rotary head, comprising a first generating step for encoding an inputted video signal to generate the video data, a second generating step for generating search video data on the basis of the video data generated in the first generating step and a recording step for recording, on the tracks, the video data generated in the first generating step, the search video data generated in the second generating step and positional information associated with a recording position of the search video data.

According to the fourth aspect of the present invention, there is provided a program for causing a computer for controlling the tracking of tracks on a magnetic tape by a rotary head to execute a first generating step for encoding an inputted video signal to generate the video data, a second generating step for generating search video data on the basis of the video data generated in the first generating step and a recording step for recording on the tracks the video data generated in the first generating step, the search video data generated in second generating step and the positional information associated with a recording position of the search video data.

In the magnetic tape tracking control apparatus and method and the program according to the present invention, an inputted video signal is encoded to generate video data. On the basis of the generated video data, search video data is generated. The generated video data, the generated search video data and the positional information about the recording position of the search video data are recorded on each track. Consequently, secure tracking can be implemented at variable-speed reproduction.

According to the fifth aspect of the present invention, there is provided a magnetic tape tracking control apparatus for controlling tracking of tracks on a magnetic tape by a rotary head, comprising a first generating means for generating a first number corresponding to a position of the tracks, which is recorded with search video data, a second generating means for generating a second number corresponding to a position of one of the tracks and a comparing means for comparing the first number with the second number to control tracking on the basis of a result of the comparison.

The second generating means may comprise a count means for counting clocks, a detecting means for detecting the track recorded with the search video data, and a first setting means for setting a count value of the counting means on the basis of a result of the detection by the detecting means.

The rotary head may comprise a first head capable of reproducing the search video data and a second head incapable of reproduction. The second generating means may further comprise a second setting means for setting a count value of the counting means on the basis of information reproduced from the magnetic tape by the second head.

The second generating means may further comprise a second setting means for setting, on the basis of the count value of the counting means and reproduced information from the track recorded with the search video data, the count value of the counting means.

The reproduced information from the track recorded with the search video data may be reproduced information that is obtained when the count value of the counting means is a value which corresponds to the track recorded with the search video data.

The reproduced information from the track recorded with the search video data may be a number recorded in the track, and the second setting means may set the count value of the counting means on the basis of the difference between the count value of the counting means and the number.

According to the sixth aspect of the present invention, there is provided a magnetic tape tracking control method for a magnetic tape tracking control apparatus for controlling tracking of tracks on a magnetic tape by a rotary head, comprising a first generating step for generating a first number corresponding to a position of the tracks, recorded with search video data, a second generating step for generating a second number corresponding to a position of one of the tracks and a comparing step for comparing the first number with the second number to control tracking on the basis of the result of the comparison.

According to the seventh aspect of the present invention, there is provided a recording medium storing a computer-readable program for a magnetic tape tracking control apparatus for controlling tracking of tracks on a magnetic tape by a rotary head, comprising a first generating step for generating a first number corresponding to a position of the tracks, a second generating step for generating a second number corresponding to a position of one of the tracks, is recorded with search video data, and a comparing step for comparing the first number with the second number to control tracking on the basis of a result of the comparison.

According to the eighth aspect of the present invention, there is provided a program for causing a computer for controlling the tracking of tracks on a magnetic tape by a rotary head to execute a first generating step for generating a first number corresponding to a position of the tracks, a second generating step for generating a second number corresponding to a position of one of the tracks, which is recorded with search video data and a comparing step for comparing the first number with the second number to control tracking on the basis of a result of the comparison.

In the magnetic tape tracking control apparatus and method and program according to the invention, a first number corresponding to track position is generated, a second number corresponding to the position of one of the tracks that is recorded with the search video data is generated, the first number is compared with the second number, and tracking is controlled on the basis of the result of the comparison. Consequently, secure tracking can be implemented at variable-speed reproduction.

According to the ninth aspect of the present invention, there is provided a magnetic tape format in which video data and search video data are recorded in tracks along with positional information associated with a recording position of the search video data.

The video data may be recorded in a sync block unit having a predetermined length, and the positional information may be recorded in a sync block which is different from a position of the search video data.

In the magnetic tape format according to the present invention, video data and search video data are recorded on each track along with the positional information about the recording position of the search video data. Consequently, secure tracking can be implemented at variable-speed reproduction.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a diagram illustrating the details of the ID, SB header and main data in the main sector shown in FIG. 4;

FIG. 6 is a diagram illustrating the details of the SB header shown in FIG. 5;

FIG. 9 is a diagram illustrating the ID of the subcode sync block shown in FIG. 8;

FIG. 10 is a diagram illustrating the subcode data shown in FIG. 8;

FIG. 11 is a diagram illustrating the tape positional information shown in FIG. 10;

FIG. 12 is a diagram illustrating the title time code shown in FIG. 10;

DETAILED DESCRIPTION OF THE PREFERRED EMBODIMENT

Figure 1:
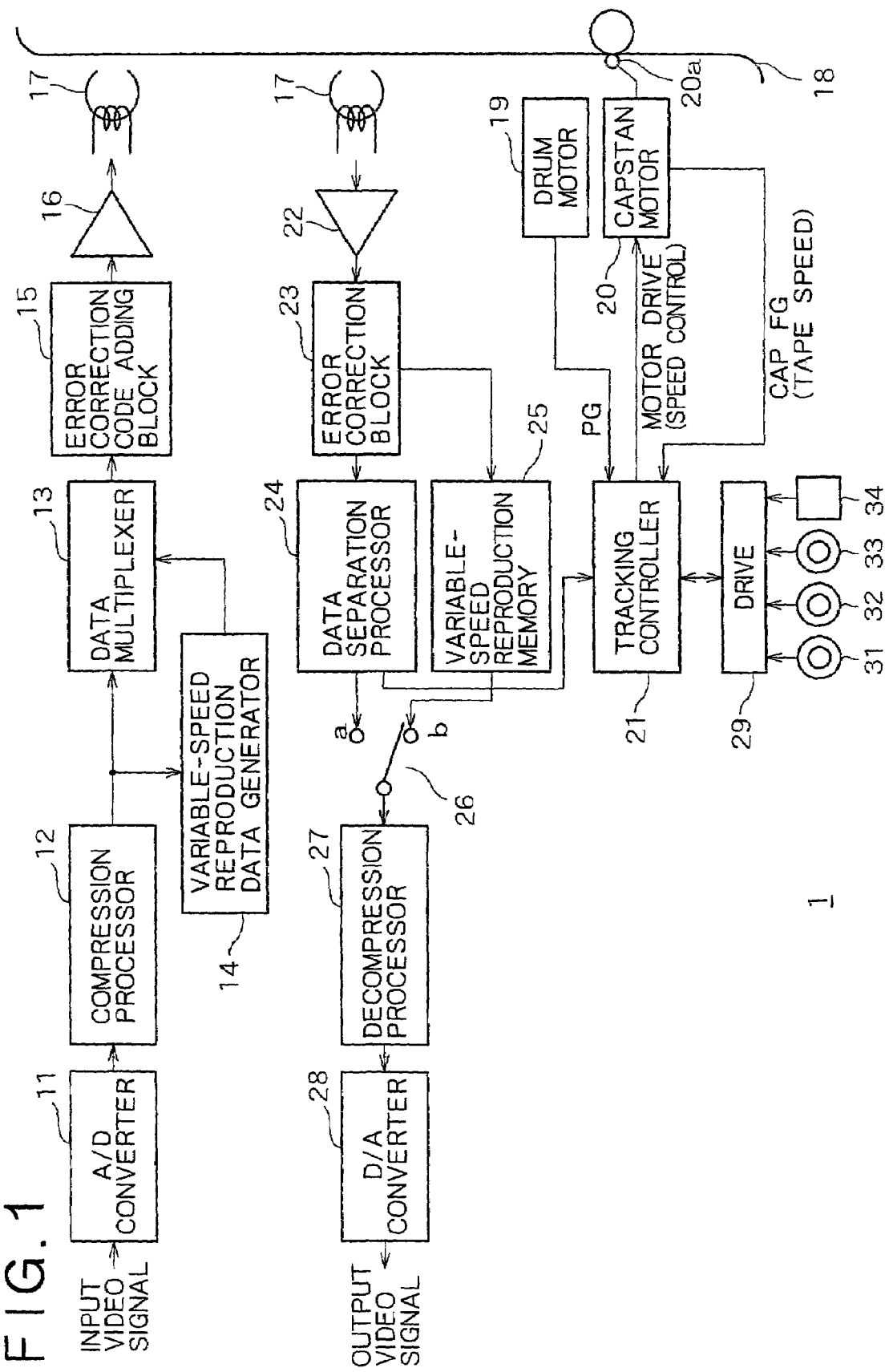
FIG. 1 is a block diagram illustrating a configuration of a recording and reproduction apparatus 1 to which the present invention is applied.

FIG. 1 is a block diagram illustrating an exemplary configuration of a recording and reproduction apparatus 1 according to the present invention.

A video signal outputted from a video camera (not shown), for example, is input to an A/D (Analog/Digital) converter 11 of the recording and reproducing apparatus 1. The A/D converter 11 converts the inputted analog video signal into digital data, which are output to a compression processor 12. The compression processor 12 compresses the input digital data in accordance with a predetermined scheme and outputs the compressed digital data to a data multiplexer 13 and a variable-speed reproduction data generator 14.

If the MPEG (Moving Picture Experts Group) standard is used for the compression by the compression processor 12, the compression processor 12 converts the inputted video data into a DCT (Discrete Cosine Transform) format, which is then encoded by the MPEG2 standard.

Figure 2:
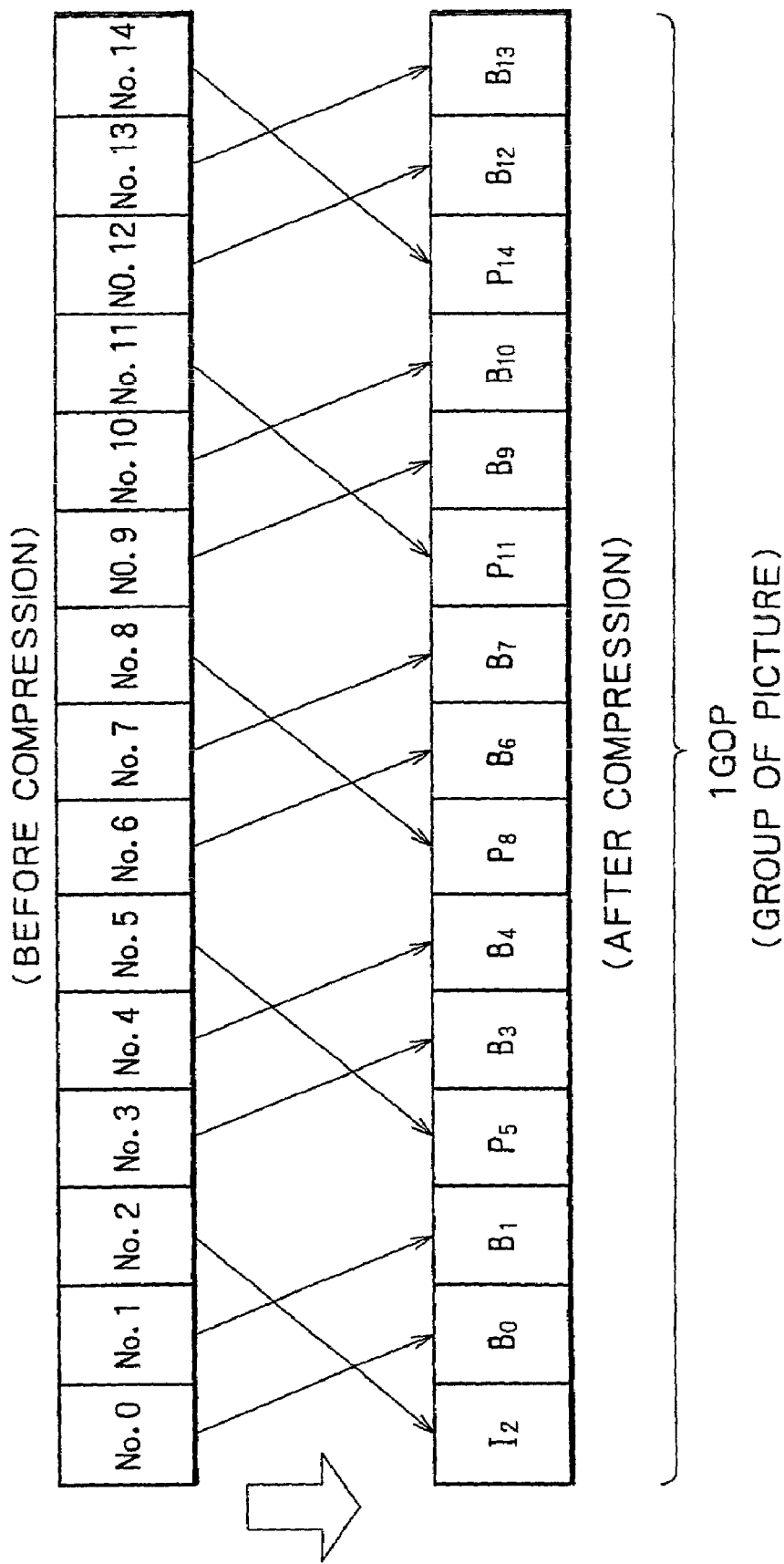
FIG. 2 is a diagram illustrating compression.

The following describes the compression processing with reference to FIG. 2. The digital data is compressed with 15 frames as 1 GOP (Group Of Picture), for example. The data in every frame is converted into one of I picture, a B picture and a P picture.

The I picture denotes video data generated by compression inside frame. The P picture denotes video data generated by compression by use of the information about the preceding frame in addition to the compression inside frame. The B picture denotes video data generated by compression by use of the information about the preceding and following frames in addition to the compression inside frame.

The generated I picture, P picture and B picture data are arranged in a predetermined sequence such that a necessary reference picture is decoded first at the time of decoding. This data stream is input to the data multiplexer 13 to be multiplexed with other data (for example, audio data, subcode and system data); and, the multiplexed data being output to an error correction code adding block 15. The data multiplexed by the data multiplexer 13 include variable-speed reproduction video data generated by the variable-speed reproduction data generator 14.

The variable-speed reproduction data generator 14 generates the video data dedicated to variable-speed reproduction (namely the variable-speed reproduction video data) by use of only the I picture of the video data outputted from the compression processor 12. The I picture is compressed by use of only the data inside frame. The P picture and the B picture are compressed also by use of the information of other frames (pictures). This denotes that the P picture and the B picture cannot be decoded unless the information of other pictures is read. The I picture can be decoded without being dependent on the reading state of other pictures, so that the I picture is suitable for the data which is read under conditions where only partial data can be read.

The error correction code adding block 15 adds an error correction code (parity) to the inputted multiplexed data and outputs the resultant data to a recording amplifier 16. The recording amplifier 16 amplifies the data added with the error correction code and supplies the amplified data to a rotary head 17.

The rotary head 17 has two heads having different azimuth angles (one is a "+" head and the other is a "−" head). The rotary head 17 is amounted on a rotary drum (not shown) that is driven by a drum motor 19 and records supplied data to a magnetic tape 18.

Figure 3:
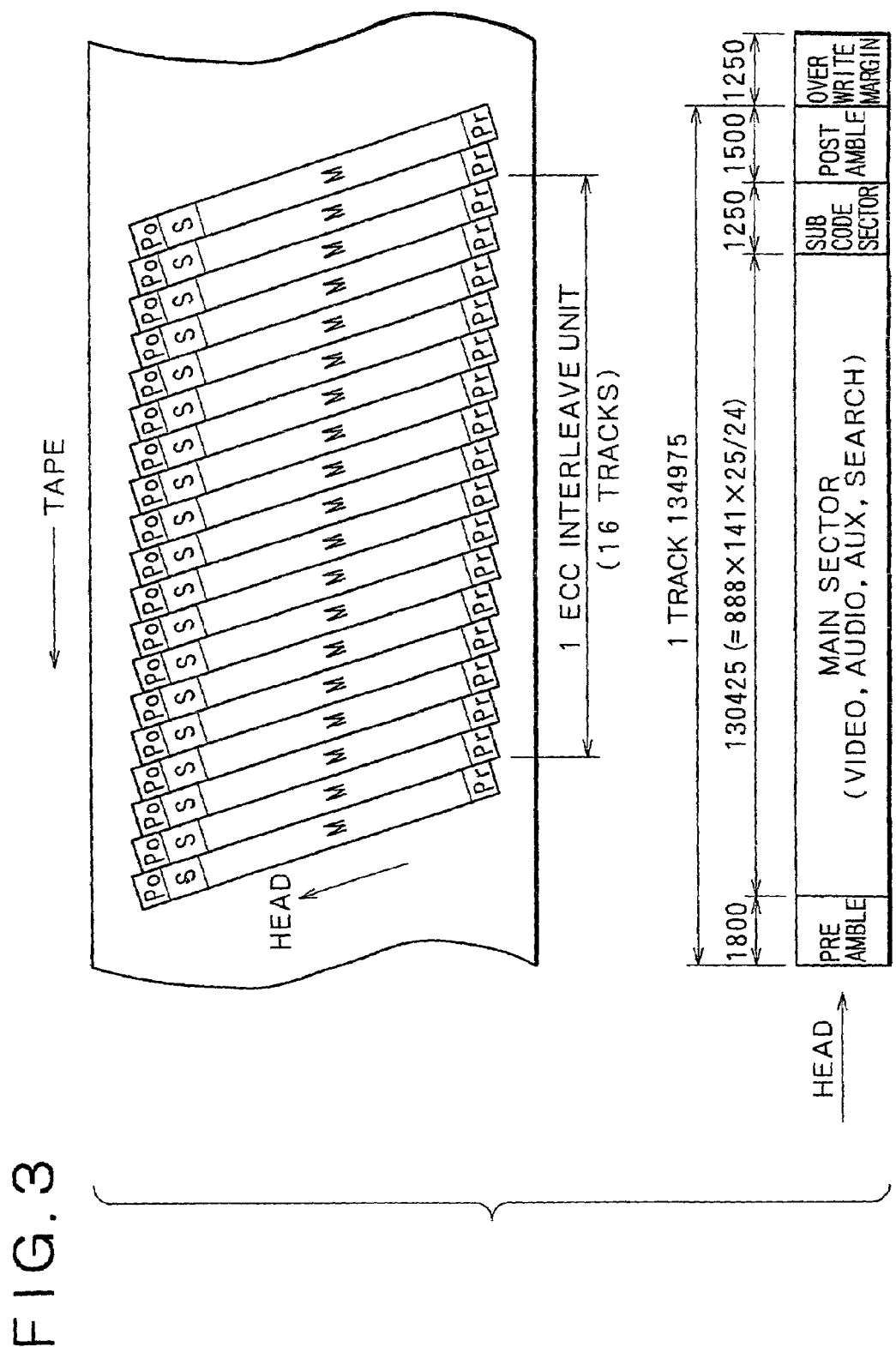
FIG. 3 is a diagram illustrating the track format of magnetic tape.

FIG. 3 illustrates an exemplary track structure of data recorded by the rotary head 17 onto the magnetic tape 18.

Before describing the track structure example shown in FIG. 3, error correction is described. Generally, when a tape-like recording medium is used, it is known that a burst error (occurring continuously) due to the defect or scratch on the magnetic substance coated on tape may occur in addition to a random error (an irregular, single-shot error). To cope with these troubles, one error correction outer code is provided for sync blocks to be recorded to a plurality of tracks. Then, these sync blocks are relocated, in accordance with a predetermined rule, all over the tracks in which the sync block constituting the code exists. This relocation processing is known as an interleave.

For high-efficiency compressed recording, a recording signal process is executed as the unit of interleaving to facilitate processing, such as, editing and reduce the scale of the recording and reproducing apparatus 1. Therefore, it is desirable for the recording pattern of variable-speed reproduction data to be compliant with interleaving.

Referring to FIG. 3 again, every time the rotary head 17 traces the magnetic tape 18 once, a preamble (Pr), main data (M), subcode sector (S) and a postamble (Po) are sequentially recorded. One ECC (Error Correcting Code) interleave unit is constituted by 16 tracks. Error correction is executed every one ECC interleave unit. Therefore, tag recording and editing on the magnetic tape 18 are also executed in one ECC interleave unit.

If the rotary head 17 is driven in synchronization with a frequency of 60×1000/1001 Hz, the length of one track is 134975 bits. Outside this one track range, an overwrite margin of 1250 bits long is formed. This overwrite margin is used to prevent incomplete data deletion.

At the beginning of every track, a preamble of 1800 bits long is arranged, followed by a main sector of 130425 bits long. The main sector is recorded with video data (Video), audio data (Audio), AUX data (AUX), or video data for search (Search). The structure of this main sector will be described with reference to FIG. 4.

The main sector is followed by a subcode sector of 1250 bits long. The subcode sector is recorded with a track number and a time code number for example. The structure of the subcode data will be described with reference to FIG. 8.

The subcode data is followed by a postamble of 1500 bits long. The preamble and the postamble are recorded with data necessary for clock generation.

Figure 4:
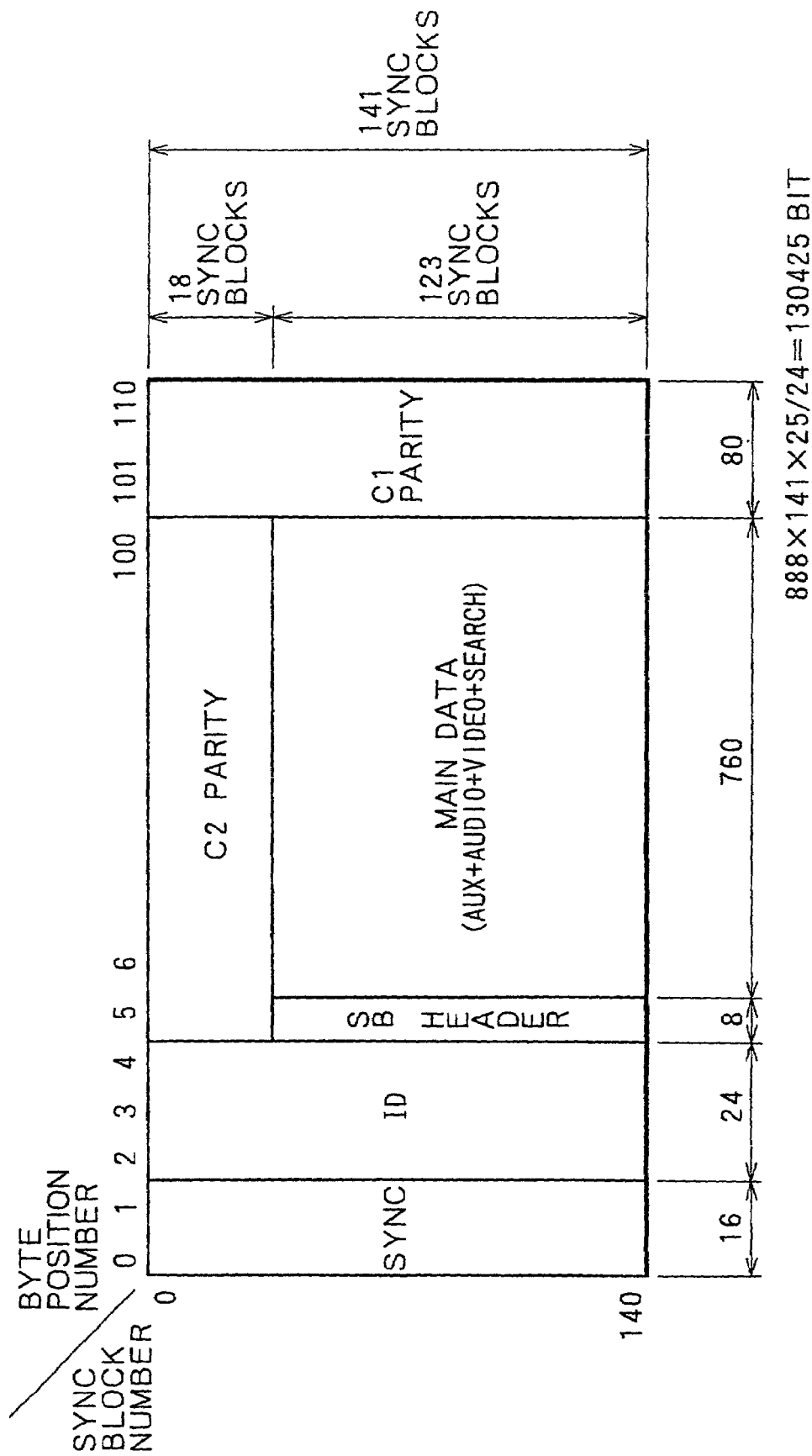
FIG. 4 is a diagram illustrating the structure of the main sector.

FIG. 4 illustrates the details of the main sector structure shown in FIG. 3. The main sector is constituted by 141 sync blocks, one sync block being 111 bytes (888 bits). Its data length is 130425 bits after application of 24–25 conversion.

The 760-bit main data formed by AUX data, audio data, video data, or search data is attached with an 8-bit SB (sync block) header indicative of the contents of the data. Further, the resultant main data is attached with a C2 parity, which is an error correction code for coping with burst errors. In addition, the main data is attached with a 24-bit ID including data address information and a C1 parity for every synch block. The C1 parity is also referred to as an inner parity and the C2 parity as an outer parity.

Every sync block is attached with a 16-bit sync pattern indicative of its beginning.

FIG. 5 illustrates the further details of the ID, sync block header, main data of the main sector. As shown in FIG. 5, the ID of the main sector is constituted by ID0 through ID2. Each of the ID0 through ID2 consists of 1 byte.

Of bits b7 through b0 of ID0, bits b7 through b5 define format type and bits b4 through b0 define track pair number. The track pair number pairs a track to be recorded by the −azimuth head with a following track to be recorded by the +azimuth head. Each of the paired tracks is assigned a same number.

ID1 defines sync block numbers (0 through 14).

ID2 carries information, as overwrite protection, indicative whether the data recorded in the main sector is newly recorded or previously recorded (previously recorded data which remains unoverwrited).

The SB header is formed by 8 bits (1 byte) of b7 through b0 as shown in FIG. 6. Of the bits b7 through b0, 3 bits of b7 through b5 set a predetermined value indicative of main data type (for example, video data (0), audio data (1), search data (2), AUX data (3), or transport stream data (4, 5)). Bits b4 through b0 set a predetermined value indicative of the details of the main data.

Value 0 indicated by 3 bits of b7 through b5 indicates that the main data is the video data (PES video data) compliant with the format of the program elementary stream (PES) compliant with MPEG2. Value 1 indicates that the main data is the audio data (PES audio data) compliant with the PES format. In this case, of bits b4 through b0, bit 4 indicates whether the data (video or audio) is partial (less than 95 bytes) or full (95 bytes). Bits b3 through b0 carry a count value indicative of continuity.

Figures 7, 8:
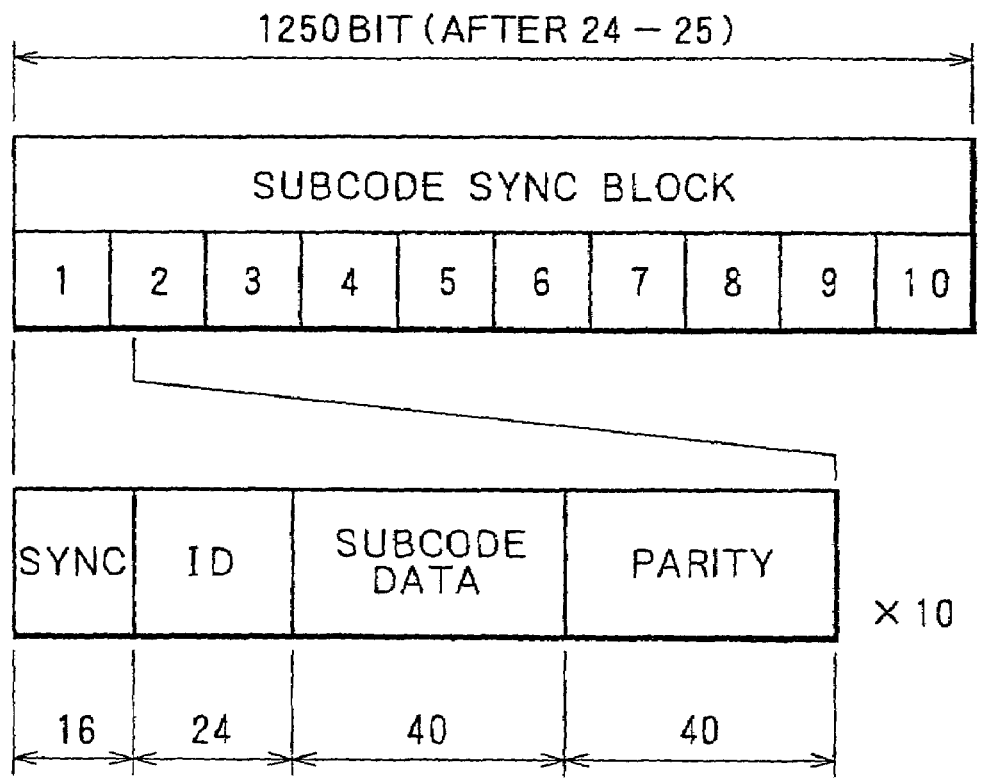
FIG. 7 is a diagram illustrating the search speed shown in FIG. 6.
FIG. 8 is a diagram illustrating the structure of the subcode sector.

Value 2 in bits b7 through b5 indicates that the main data is data for searching. In this case, of the bits b4 through b0, bit b4 carries data indicating whether the search data is video data or audio data. Bits b3 through b1 carry data indicative of a search speed. For example, as shown in FIG. 7, value 1 in bits b3 through b1 indicates 4-fold speed, value 2 indicates 8-fold speed, value 3 indicates 16-fold speed, value 4 indicates 24-fold speed and value 5 indicates 32-fold speed. It is to be noted that, by making the r.p.m. of the rotary drum follow a desired search speed (desired n-fold speed), an extended search can be realized. The video data for searching are low-bit-rate data with the high pass component of the I picture dropped.

Referring to FIG. 6 again, value 3 in bits b7 through b5 indicates that the main data is AUX (auxiliary) data. In this case, bits b4 through b2 of bits b4 through b0 carry data which indicates the type (AUX mode) of AUX data.

Value 4 in bits b7 through b5 indicates that the main data is the first halt of the data recorded in the form of transport stream. In this case, bits b4 and b3 have a jump flag and bits 2 through bit 0 have a time stamp. Value 5 in bits b7 and b5 indicates that the main data is the last half of the data recorded in the form of transport stream. In this case, bits b4 through b0 carry a count value which indicates continuity.

Value 6 in bits b7 through b5 indicates that no data is recorded as the main data. Namely, these bits indicate null. This null is inserted if the average total amount of the main data is smaller than a recordable rate. For example, if the rate in transport stream recording is 20 Mbps, then NULL equivalent to 5 Mbps is inserted.

FIG. 8 illustrates the details of the subcode sector structure shown in FIG. 3.

The subcode sector in 1 track is 1250 bits long after 24–25 conversion and consists of 10 subcode sync blocks.

One subcode sync block is formed by a 16-bit sync, a 24-bit ID, a 40-bit subcode data and a 40-bit parity before 24–25 conversion. Namely, the length of 1 subcode sync block is 120 bits, which is about 1/7 of the length of 1 sync block (888 bits) of the above-mentioned main sector. Thus, by reducing the length of data, the contents of each subcode sync block can be securely read even at a high-speed reproducing operation as high as 200-fold, thereby enabling high-speed searching.

This sync, which is different from the sync which is attached to the main sector, identifies main sector and subcode sector.

The ID of each sync block of the subcode sector is formed by ID0 through ID2 as shown in FIG. 9. Each of ID0 through ID2 consists of 1 byte.

Of the bits b7 through b0 of ID0, bits b7 through b5 define a track format type and bits b4 through b0 define a track pair number.

Of the bits b7 through b0 of ID1, bits b7 through b4 are reserved bits. Bits b3 through b0 define a subcode sync block number. The sync block number is 0 to 9 which is allocated to each 10 subcode sync blocks included in the subcode sector of 1 track.

ID2 provides information, as overwrite protection, which indicates whether the data recorded in the subcode sector is newly recorded (namely, recorded for the first time on the portion recorded with nothing before) or recorded in an overwritten manner (recorded over some data recorded previously). It is to be noted that, in the subcode sector, if the ID2 indicates that the recorded data is overwritten data, processing is executed by invalidating all sync blocks (as not obtained).

The subcode data arranged subsequent to the ID of the subcode sync block differs between the case of user tape and the case of Pre-REC tape for example. In the case of user tape, the subcode data is tape positional information (ATNF: Absolute Track Number and Flag), title time code (TTC), recording date (REC DATE), or recording time (REC TIME) as shown in FIG. 10A. In the case of Pre-REC tape, the subcode data is tape positional information, title time code, part number (PART No.), or a chapter start position (CHAPTER START) as shown in FIG. 10B. Namely, in the case of Pre-REC tape, part number is included instead of recording date, and in the case of user tape, chapter start position is included instead of recording time.

FIG. 11 illustrates the details of the structure of the tape positional information (ATNF) in subcode data. As shown in the diagram, the tape positional data consists of 8 bits of bits b7 through b0.

Bit b7 is I flag. The I flag is "1" when the main sector corresponding to the subcode sector includes the information indicative of a search position (information indicative of a position specified at the time of recording). By this flag, the search position is detected. Bit b6 is a reserved bit.

Bit b5 is P flag. The P flag is "1" when the main sector corresponding to the subcode sector includes still picture recording start video data. By this flag, a still picture recording position is detected.

Bit b4 is EH (Edit Header) flag. The EH flag is "1" when an I picture or a P picture is recorded in the main sector corresponding to the subcode sector. Normally, an editing operation, such as tag recording, starts with an I picture or a P picture, so that an edit position can be detected by this EH flag.

Bits b3 through b0 have an edit picture offset (EPO). The EPO indicates the position of the main sector corresponding to the subcode sector in the unit of 16 tracks.

FIG. 12 illustrates the details of the structure of a title time code in subcode data. As shown in the diagram, the title time code consists of 4 bytes, data D1 through D4 of each byte consisting of 8 bits of b7 through b0.

Each bit is assigned with a code associated with recording start track position (hour (h), minute (m), second (s) and frame (f)). The remaining bits b7 and b6 are assigned with a modulo-3 counter value (S2, S1) indicative of a search data recording position in the unit of ECC interleave. For example, when the value of the modulo-3 counter is 0, these bits are "00", when the value is 1, these bits are "01", and when the value is 2, these bits are "10".

S4 of bit b7 is set to "No Info Flag" which is "1" when there exits no video, audio, or AUX data. S6 and S5 of bits b7 and b6 are set to a picture type flag. These bits are "01" for I picture, "10" for P picture, "11" for B picture and "00" for others.

This title time code is repeated three times in each subcode sync block.

Referring back to FIG. 1, a tracking controller 21 controls the rotation of a capstan motor 20 such that the detected tracking information obtained by inertia-processing a track number obtained by the rotary head 17 matches a reference tracking phase (this control is referred to as tape speed control). Namely, this control is executed such that the magnetic tape 18 travels in "the phase locked state=24 times the normal speed." The control method of matching the detected tracking information with the tracking phase will be described later with reference to FIG. 13.

The capstan motor 20 rotates a capstan 20a such that the magnetic tape 18 travels at normal speed (1-fold speed) in the recording mode. Also, the capstan motor 20 executes a tracking servo operation through a tracking detector, not shown, of a reproduction amplifier 22 in the normal reproduction mode (1-fold-speed reproduction). On the other hand, in the 24-fold-speed reproduction mode, the capstan motor 20 executes tracking control on 24-fold-speed search data through the tracking controller 21, thereby rotating the capstan 20a to cause the magnetic tape 18 to travel at 24-fold speed.

The drum motor 19 rotates a drum, not shown, at a predetermined rotational speed (300 Hz, 10 times the frame) on the basis of an input video signal in the recording mode. On the other hand, in the reproduction mode, the drum motor 19 rotates the rotary drum at a predetermined rotational speed (300 Hz, 10 times the frame) on the basis of an output video signal. On the basis of a control signal supplied from the tracking controller 21, the capstan motor 20 drives (rotates) the capstan 20a. Consequently, the magnetic tape 18 loaded on the rotary drum is run at a predetermined tape travel speed, thereby recording or reproducing data.

If, in adding to executing tracking control, the tracking controller 21 controls the all operations of the recording and reproducing apparatus 1, a drive 29 is connected to the tracking controller as required. In this drive, a magnetic disk 31, an optical disk 32, a magneto-optical disk 33, or a semiconductor memory 34 is loaded as required, thereby transferring data.

The data including the video data recorded on the magnetic tape 18 are read (reproduced) by the rotary head 17 and are output to the reproduction amplifier 22. The reproduction amplifier 22 amplifies the supplied reproduction data and supplies the amplified data to an error correction block 23. The error correction block 23 executes error correction on the supplied data and outputs the error-corrected data to a data separation processor 24 and a variable-speed reproduction memory 25. The data separation processor 24 executes a process which is reverse to the process executed by the data multiplexer 13. Namely, the data separation processor 24 separates the inputted multiplexed data into video data, audio data and system data.

Of these separated data, the video data are output to a decompression processor 27. A switch 26 connected to the decompression processor 27 is set to the terminal a side at the time of normal reproduction time (1-fold speed reproduction in forward direction) to output the video data from the data separation processor 24 to the decompression processor 27. At the time of other reproduction (variable-speed reproduction), the switch is set to the terminal b side to output the data stored in the variable-speed reproduction memory 25 to the data decompression processor 27.

The variable-speed reproduction memory 25 stores the video data generated by the variable-speed reproduction data generator 14. At the time of variable-speed reproduction, data is intermittently input in the error correction block 23, so that error correction is executed only on an inner code, and the video data error-corrected only for that inner code is stored in the variable-speed reproduction memory 25. The video data stored in the variable-speed reproduction memory 25 may be read by either a method in which the reading is executed at a certain period synchronized with the frame of reproduction video or a method in which the reading is executed at a point of time when the video data for one frame has been stored.

The decompression processor 27 executes decompression processing (such as MPEG decoding and inverse DCT conversion) on the video data supplied from the switch 26 and outputs the decompressed video data via a D/A converter 28 to, for example a television receiver (not shown) as a display device.

Figure 13:
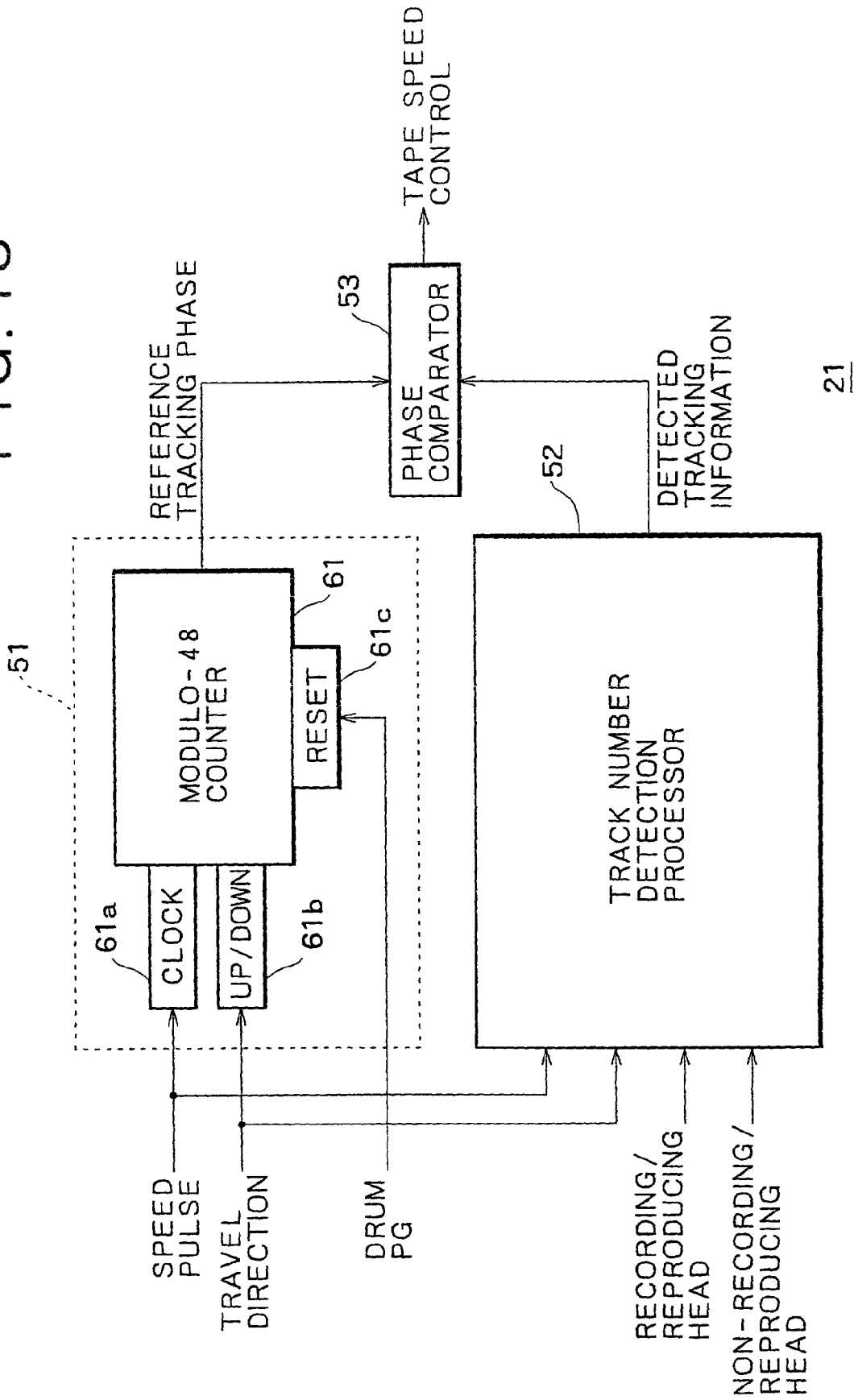
FIG. 13 is a block diagram illustrating an exemplary configuration of the inside of the tracking control block shown in FIG. 1.

FIG. 13 is a block diagram illustrating an exemplary configuration of the inside of the tracking controller shown in FIG. 1.

The speed pulses (number of which is proportional to the tape speed and is twice the number "n" in the case where the tape speed is in the n-fold speed mode) output from the capstan motor 20 are input to a clock terminal 61a of a modulo-48 counter 61 of a reference phase generator 51. A travel direction (polarity) signal outputted from the capstan motor 20 is inputted in an up/down terminal 61b of the modulo-48 counter 61. The drum PG signal outputted from the drum motor 19 is input to a reset terminal 61c of the modulo-48 counter 61.

The modulo-48 counter 61 of the reference phase generator 51 recognizes the travel direction of the magnetic tape 18 from the signal supplied through the up/down terminal 61b and, on the basis of a count result, counts the pulses supplied via the clock terminal 61a. For example, if the direction in which the magnetic tape 18 travels is forward (FWD), the pulses are counted up; if it is reverse (REV), the pulses are counted down. The modulo-48 counter 61 also resets the count value on the basis of the drum PG supplied via the reset terminal 61c. The modulo-48 counter 61 is reset by the drum PG and outputs a count value synchronized with the drum rotational phase to a phase comparator 53 as a reference tracking phase.

A track number detection processor 52 detects the number of a track recorded with search data on the basis of the speed pulse and travel direction signal outputted from the capstan motor 20 and a reproduction signal supplied from a recording/reproducing head and a non-recording/reproducing head to be described later and outputs the detected track number to the phase comparator 53 as a detected tracking information.

The phase comparator 53 compares the reference tracking phase inputted from the reference phase generator 51 with the phase of the detected (search) tracking information inputted from the track number detection processor 52, generates a tape speed control signal in accordance with a resultant count value (track) difference, and supplies the generated tape speed control signal to the capstan motor 20. Consequently, the tape travel speed (phase) is controlled (tracking-controlled) such that the reference tracking information matches the detected tracking information. Namely, to cause tape phase to advance, the tape travel speed is feedback-controlled to increased, and to cause tape phase to lag behind, the tape travel speed is feedback-controlled to decreased.

Figure 14:
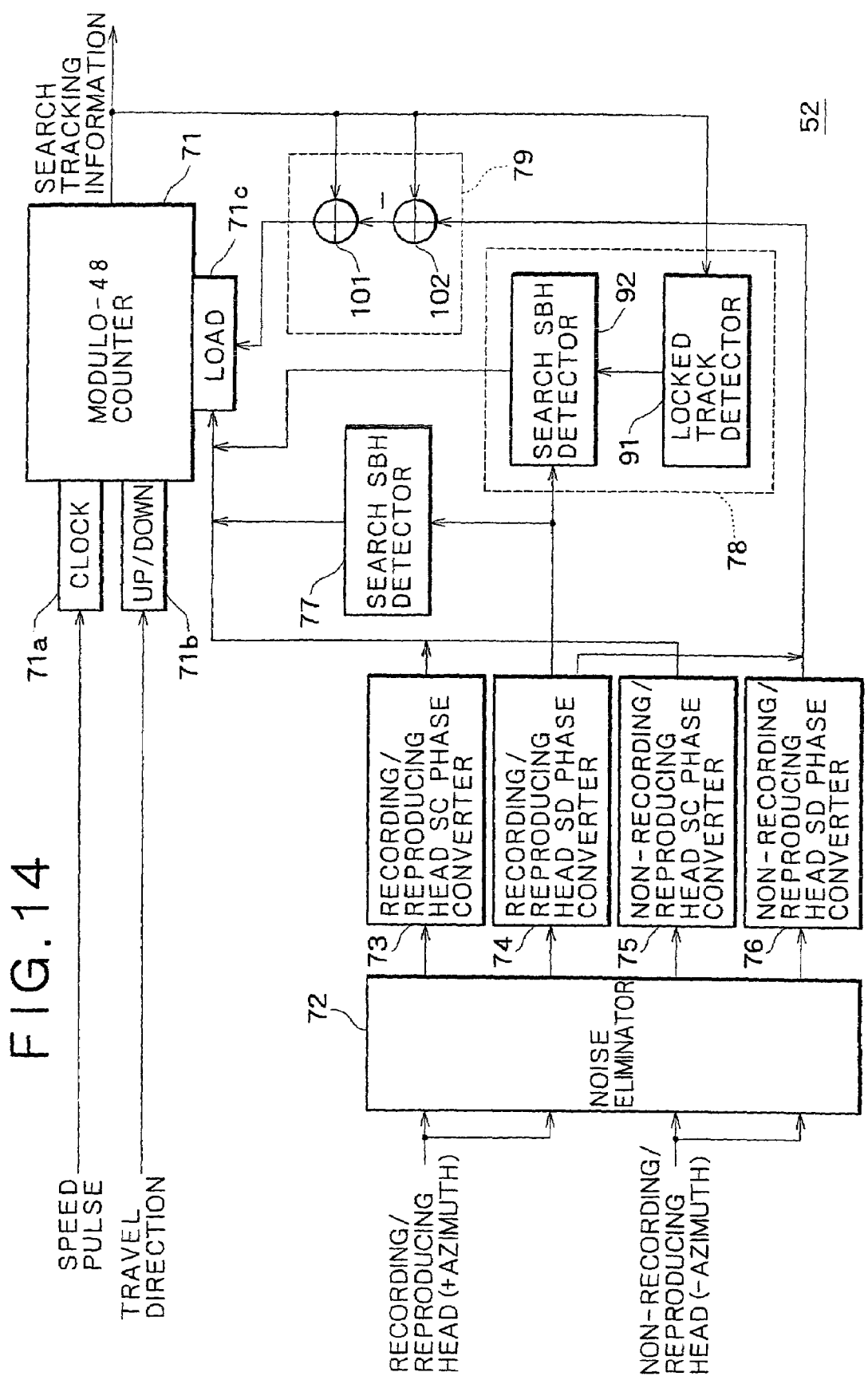
FIG. 14 is a block diagram illustrating an exemplary configuration of the inside of the track number detection processor shown in FIG. 13.

FIG. 14 is a block diagram illustrating an exemplary configuration of the inside of the track number detection processor 52 shown in FIG. 13.

The speed pulses outputted from the capstan motor 20 are input to a clock terminal 71a of a modulo-48 counter 71. The travel direction signal outputted from the capstan motor 20 is input to an up/down terminal 71b of the modulo-48 counter 71.

Of the two rotary heads 17, a reproduction signal from the +azimuth head (recording/reproducing head) for search data recording and reproduction has noise eliminated from it by a noise eliminator 72, and the resultant reproduction signal is output to a recording/reproducing head SC (subcode) phase converter 73 and a recording/reproducing head SD (search data) phase converter 74.

Of the two rotary heads 17, the reproduction signal from the −azimuth head (non-recording/reproducing head) which does not perform search data recording and reproduction has noise eliminated from it by the noise eliminator 72, and the resultant reproduction signal is output to a non-recording/reproducing head SC phase converter 75 and a non-recording/reproducing head SD phase converter 76.

The noise eliminator 72 validates only the data restored by parity C1 as inner code and outputs the same repeated required data (in the subcode area, modulo-3 counter value and track pair number and, in the main area, sync and track pair number or 24-fold-speed search sync block header and track pair number) as valid data. Namely, when the valid data has been obtained, the subsequent devices operate, finally causing the modulo-48 counter 71 to perform phase sync processing.

The recording/reproducing head SC phase converter 73 generates load data for the modulo-48 counter 71 from the modulo-3 phase (S2 and S1 shown in FIG. 12) and track pair number (FIG. 9) obtained from the subcode information reproduced by the recording/reproducing head (+azimuth head) in accordance with equation (1) below:

Load data for modulo-48 counter=(modulo-3 counter×16)+(lower 3 bits of track pair number×2)+1 (1)

The recording/reproducing head SD phase converter 74 separates the track pair number (FIG. 5) in the ID of the main sync block reproduced by the recording/reproducing head (+azimuth head) from the 24-fold-speed search sync block header (FIG. 5).

The non-recording/reproducing head SC phase converter 75 generates load data for the modulo-48 counter 71 from the modulo-3 phase and track pair number obtained from the subcode information reproduced by the non-recording/reproducing head (−azimuth head) in accordance with equation (2) below:

Load data for modulo-48 counter=(modulo-3 counter×16)+(lower 3 bits of track pair number×2) (2)

The non-recording/reproducing head SD phase converter 76 separates the track pair number in the ID of the main sync block reproduced by the non-recording/reproducing head (−azimuth head) from the 24-fold-speed search sync block header.

When a search SBH (sync block header) detector 77 detects a 24-fold-speed search sync block header from the output of the recording/reproducing head SD phase converter 74, it denotes that this track is a target track to be phase-locked (because the position at which the 24-fold-speed search sync block header has been detected is in the recording ECC block with modulo-3 counter value=0), so that the search SBH detector 77 generates load data from the track pair number outputted from the recording/reproducing head SD phase converter 74 in accordance with equation (3) below and outputs the generated load data to a load terminal 71c of the modulo-48 counter 71:

Load data=(track pair number×2)+1 (3)

An error lock detector 78 provided for a situation in which subcodes cannot be detected for some reason, consists of a locked track detector 91 and a search SBH detector 92. The locked track detector 91 determines on the basis of the detected tracking information outputted from the modulo-48 counter 71 whether or not the phase of the modulo-48 counter 71 is locked to a target track (for example, as will be described with reference to FIG. 16, if the search data is recorded in track No. 13 in the value of the modulo-48 counter 71, the locked track detector 91 determines whether or not the value of the modulo-48 is 13). The search SBH detector 92 detects that the 24-fold-speed search sync block header has not been detected by the recording/reproducing head SD phase converter 74, although the lock track has been detected by the locked track detector 91 (value of the modulo-48 counter is 13). Upon detection thereof, the search SBH detector 92 outputs the load data for incrementing the counter value by 16 to the modulo-48 counter 71 in order to shift the lock phase by 16 tracks.

Namely, for example, although the value of the modulo-48 counter 71 is 13, if no 24-fold-speed search sync block has not been detected, the value of the modulo-48 counter 71 is shifted to 29 (=13+16) and a pull-in control operation is executed to bring this counter value to 13 again. If the value of the modulo-48 counter 71 is still 13 and no 24-fold-speed search sync block has been detected, the value of the modulo-48 counter 71 is further incremented by 16. Consequently, while this process is executed twice, the recording phase of 3 ECC can be locked without failure.

A correction block 79 consists of two adders 101 and 102. The adder (subtractor) 102 computes the difference between the "(value obtained by doubling the lower 3 bits of track pair number)+1" outputted from the recording/reproducing head SD phase converter 74 or the "(value obtained by doubling the lower 3 bits of track pair number)+0" output from the non-recording/reproducing head SD phase converter 76 and the lower 4 bits of the modulo-48 counter 71.

The adder 101 adds the output of the adder 102 to the output of the modulo-48 counter 71 and loads the result to the modulo-48 counter 71. Every track undergoes a bend or a positional offset due to mechanical error and, therefore, the value of the modulo-48 counter 71 has a maximum error of ±2. However, the above-mentioned process corrects the modulo-48 counter 71 within a range of +7 to −8 greater than the maximum error of ±2, the lower 4 bits being synchronized with the value of the "track number" obtained from the reproduction track pair number (recording/reproducing head is the "(value obtained by doubling the value of lower 3 bits of track pair number) +1" and the non-recording/reproducing head is the "(value obtained by doubling the value of lower 3 bits of track pair number) +0").

Here, the count value of the modulo-48 counter 71 indicates the continuous track pair numbers recorded on the magnetic tape 18 currently being reproduced by the rotary head 17. Therefore, the modulo-48 counter 71 continuously generates the track numbers (track pair numbers) recorded on the magnetic tape 18 that is currently being reproduced by the rotary head 17. Namely, the modulo-48 counter 71 continuously generates information indicative of which portion of the magnetic tape 18 is currently reproduced by the rotary head 17.

Figure 15:
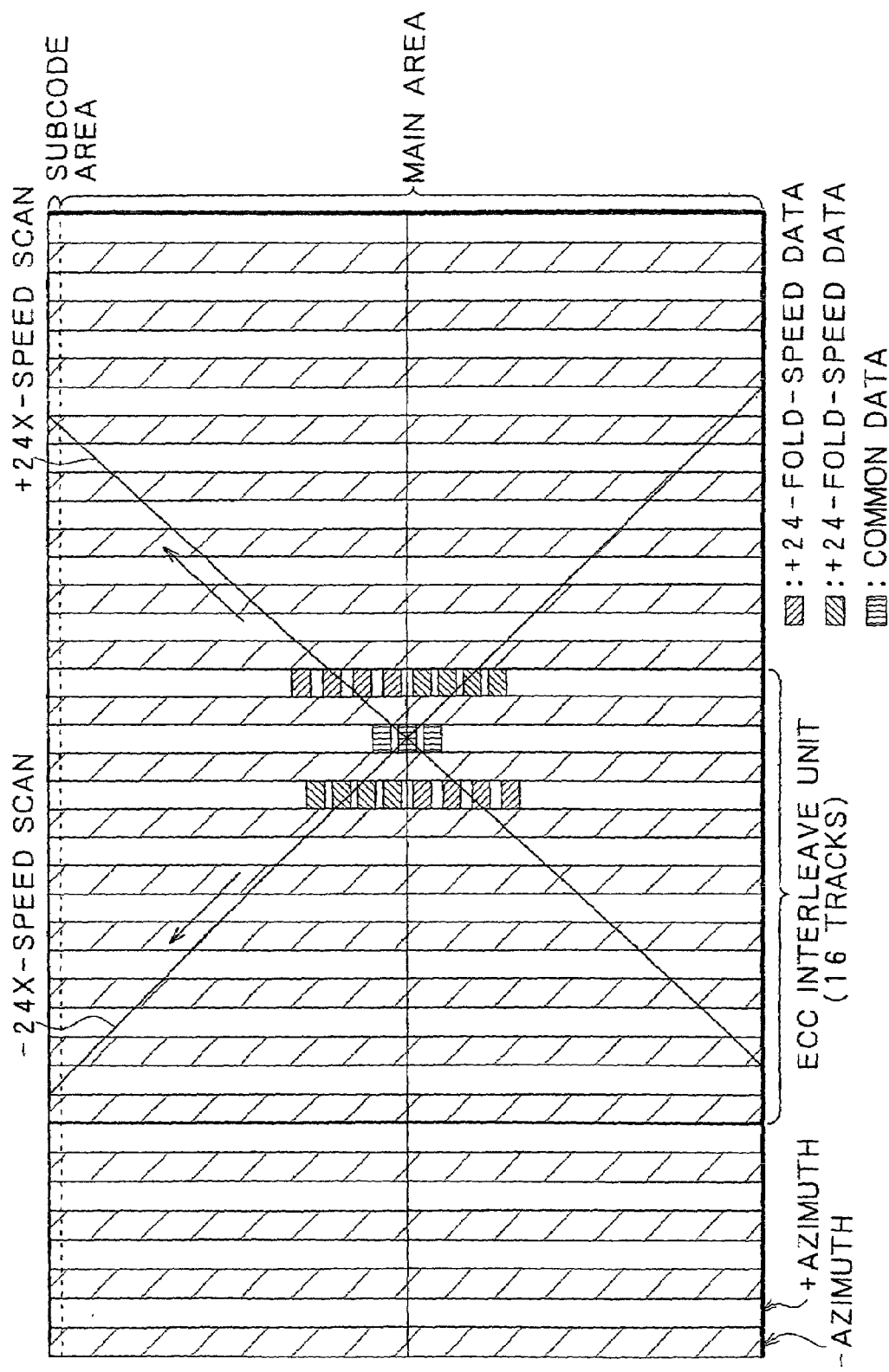
FIG. 15 is a diagram illustrating an exemplary arrangement of the search video data area for 24-fold-speed reproduction.

FIG. 15 illustrates an arrangement pattern of the search video data for 24-fold-speed reproduction. In the figure, +24-fold-speed scan denotes a scan locus at the time of forward 24-fold-speed reproduction and −24-fold-speed scan denotes a scan locus at the time of reverse 24-fold-speed reproduction.

The 24-fold-speed reproduction data is arranged in the middle of each track outside the drum entrance at which data acquisition is unstable, as shown in FIG. 15. Because the necessary search data are not accommodated in the acquired width of one track (effective width of a shape of a Japanese abacus bead ≈ width in which the rotary head 17 is on the track), the reproduction data are divided and recorded in 3 tracks (namely, tracks 11, 13 and 15).

Further, in order to securely acquire the search data by considering tracking error, the reproduction data are repeatedly recorded on the same track, 3 times on track No. 13 central to tracking control and 4 times on the adjacent tracks Nos. 11 and 15.

Furthermore, taking the processing in the unit 16 tracks, which is the unit of ECC interleave, into consideration, the data is recorded with the head scan being 24-fold-speed of an integral multiple of ECC, 16×3=48 tracks (3 ECC). Namely, as shown in FIG. 16, the data is recorded only on 1 ECC in a period of 3 ECC.

It is to be noted that in FIG. 15, the data hatched in lower right direction indicates +24-fold-speed data, the data hatched in lower left indicates −24-fold-speed data, and the data hatched vertically indicates the data commonly used by +24-fold speed and −24-fold speed.

Figure 16:
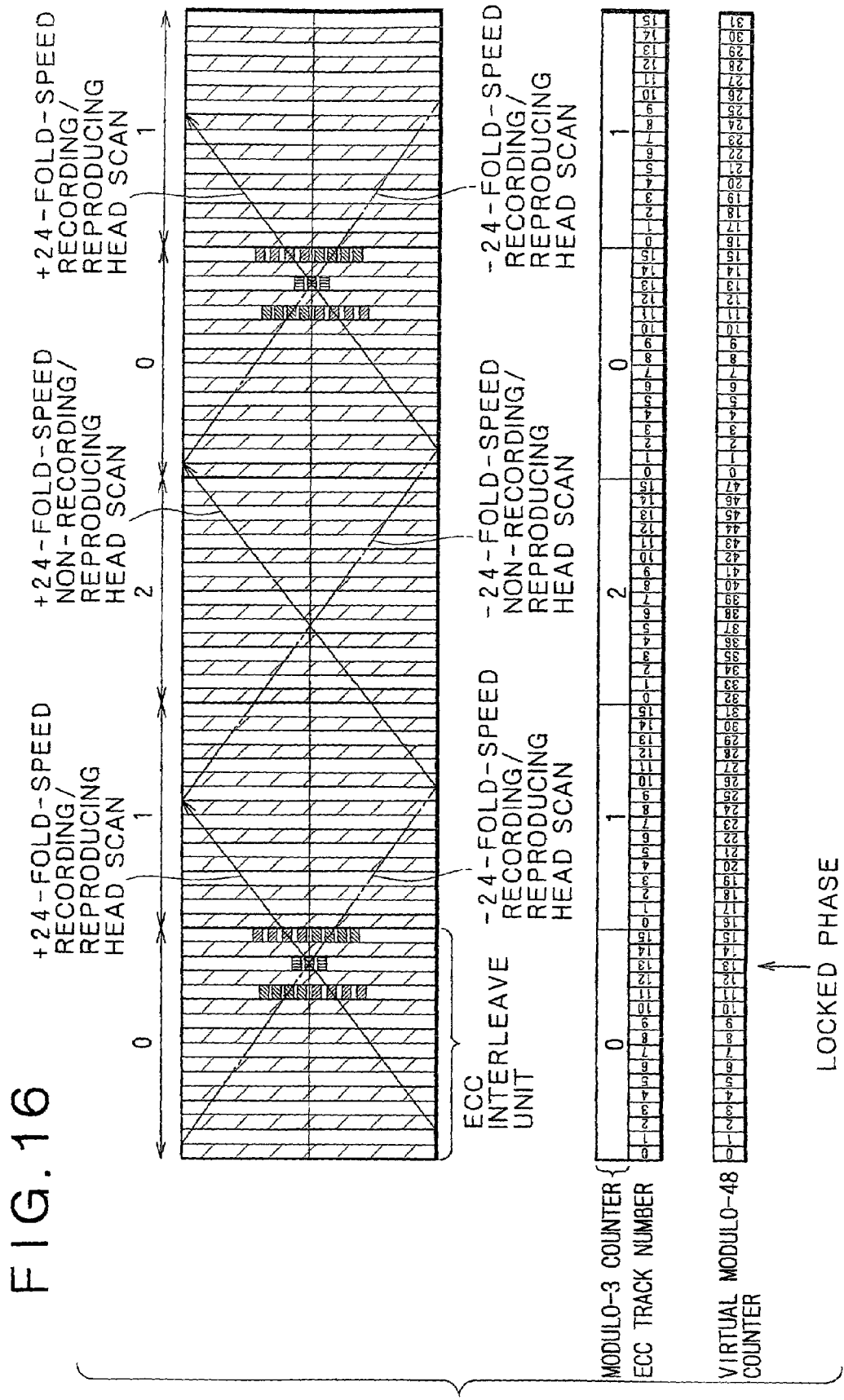
FIG. 16 is a diagram illustrating the tracking state in which phase locking is executed.

FIG. 16 illustrates a tracking state in which the search data for 24-fold-speed reproduction is phase locked. In the figure, the scan of the +24-fold-speed recording/reproducing head indicates a scan locus at the time of the 24-fold-speed reproduction of the forward search data recording/reproducing head, the scan of the −24-fold-speed recording/reproducing head indicates a scan locus at the time of the 24-fold-speed reproduction of the reverse search data recording/reproducing head, the scan of +24-fold-speed non-recording/reproducing head indicates a scan locus at the time of the 24-fold-speed reproduction of the forward search data non-recording/reproducing head, and the scan of the −24-fold-speed non-recording/reproducing head indicates a scan locus at the time of the 24-fold-speed reproduction of the reverse search data non-recording/reproducing head.

The −24-fold-speed non-recording/reproducing head scan is reverse in azimuth to the search data recording head (+azimuth head) and, therefore, it is impossible to acquire search video data. The sync information of the modulo-48 counter can be acquired from the subcode recorded by the −azimuth head and the ID of the main sync block.

Thus, use of the value of the modulo-48 counter 71 as the search phase (tracking) servo detection information by arranging a subcode modulo-3 counter in the title time code can securely phase-lock the 24-fold-speed search data arranged in every 3 ECC blocks (every 48 tracks).

The following describes a recording operation to be executed by the recording and reproducing apparatus 1 shown in FIG. 1.

An analog video signal output from a video camera, not shown, for example, is converted by the A/D converter 11 into digital video data, which are then supplied to the compression processor 12. The video data supplied to the compression processor 12 is compressed on the basis of MPEG standard, for example, and the compressed video data are then output to the data multiplexer 13 and the variable-speed reproduction data generator 14.

Of the inputted video data, the variable-speed reproduction data generator 14 generates the video data dedicated to variable-speed reproduction by use of only the I picture and supplies the generated video data to the data multiplexer 13. At this moment, the value of the modulo-3 counter is assigned to the reserved bit of the title time code.

The data multiplexer 13 multiplexes the video data supplied from the compression processor 12 with the video data dedicated to variable-speed reproduction supplied from the variable-speed reproduction data generator 14 and outputs the multiplexed video data to the error correction signal adding block 15. The multiplexed data inputted to the error correction code adding block 15 are added with an error correction code, and the resultant video data are supplied to the rotary head 17 via the recording amplifier 16. The rotary head 17 records the supplied video data to the magnetic tape 18.

The following describes a 24-fold-speed search reproduction operation to be executed by the recording and reproducing apparatus 1 shown in FIG. 1.

The tracking controller 21 controls (tape control) the rotation of the capstan motor 20 such that the detected tracking information obtained by inertia-processing a track number obtained by the rotary head 17 matches the reference tracking phase (FIG. 13) (or such that the magnetic tape 18 travels "in the phase-locked state=at a speed 24 times the normal speed").

When the magnetic tape 18 is run at a predetermined travel speed, the recording/reproducing head for recording/reproducing search data on the rotary head 17 reads the search video data (FIG. 16) from the magnetic tape 18 and supplies these data to the error correction block 23 via the reproduction amplifier 18. The error correction block 23 executes error correction on the reproduction data supplied via the reproduction amplifier 18 and outputs the error-corrected reproduction data to the data separation processor 24. The data separation processor 24 separates the inputted multiplexed data into video data, audio data and system data, for example, and supplies these data to the tracking controller 21.

When the recording/reproducing head traces the main area, the reproduction signal to be output from this recording/reproducing head has the noise eliminated from it by the noise eliminator 72 and is then output to the recording/reproducing SD phase converter 74. When the recording/reproducing head SD phase converter 74 has reproduced the search image data shown in FIG. 16 for example, it separates the track pair number in the ID of the main sync block reproduced by the recording/reproducing head and the 24-fold-speed search sync block header. Namely, in the state where the search video data shown in FIG. 16 is phase-locked for reproduction, the track pair number is sequentially separated into "5", "6" and "7", which are then output to the search SBH detector 77.

The search SBH detector 77 doubles the track pair numbers (in this case, "5", "6" and "7") supplied from the recording/reproducing head SD phase converter 74 and adds 1 to the result to generate ECC track numbers "11", "13" and "15", which are then output to the load terminal 71c of the modulo-48 counter 71.

Figure 17:
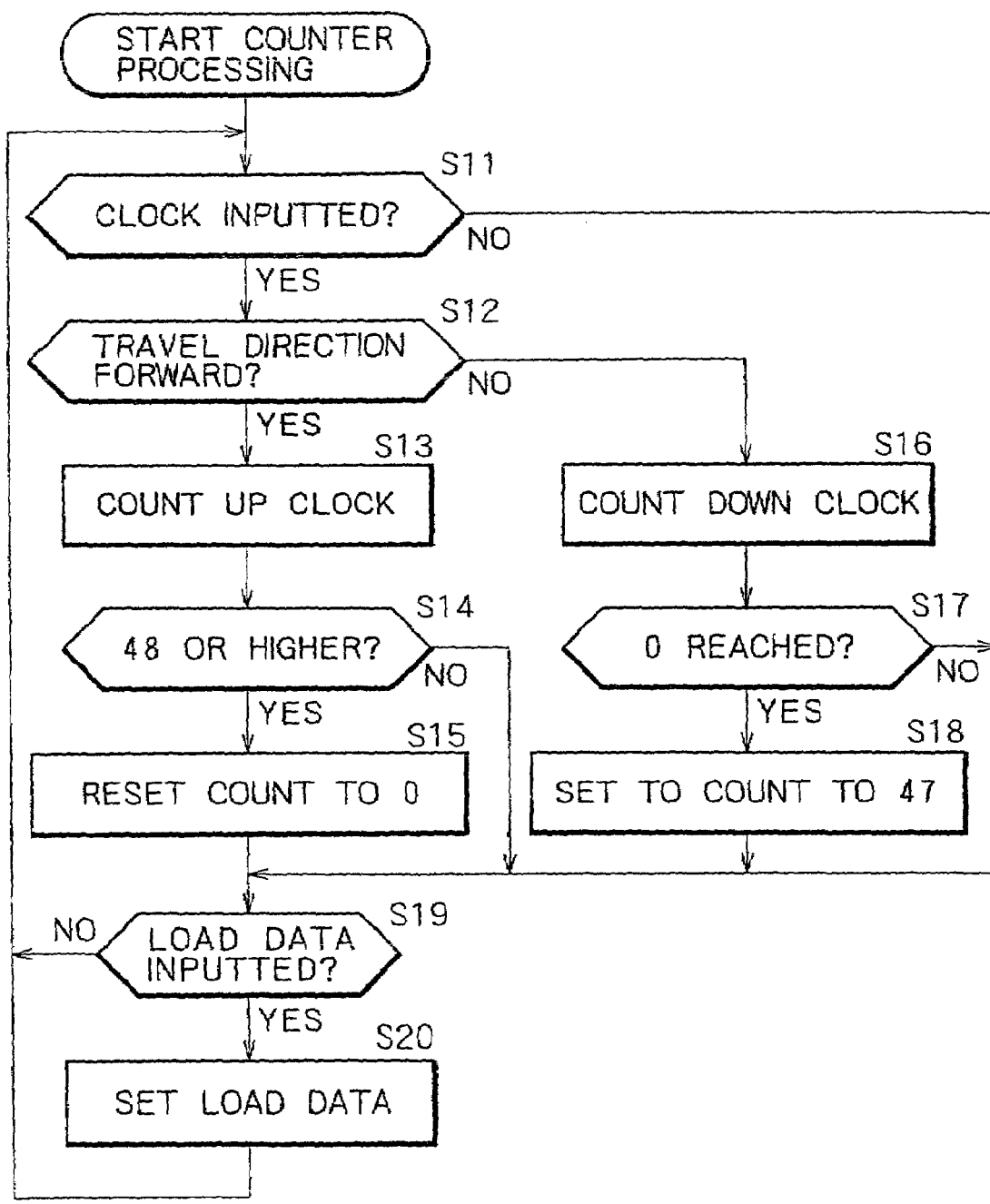
FIG. 17 is a flowchart describing count processing.

The modulo-48 counter 71 executes the processing shown in FIG. 17. In step S11, the modulo-48 counter 71 determines whether or not a clock has been inputted from the clock terminal 71a. If no clock has been inputted, the procedure goes to step S19. If the clock has been inputted, the procedure goes to step S12 to determine whether or not the travel direction is forward (+24-fold-speed search).

If, in step S12, the travel direction is forward, then the procedure goes to step S13 to count up the clock by 1. In step S14, the modulo-48 counter 71 determines whether or not the count has reached 48 or higher. If the count is not 48 or higher, the procedure goes to step S19. If the count has reached 48 or higher, the procedure goes to step S15 to set (reset) the count to 0.

If, in step S12, the travel direction is not forward, namely, if the travel direction is reverse (−24-fold-speed search), then the procedure goes to step S16 to count down the clock by 1. In step S17, the modulo-48 counter 71 determines whether or not the count has reached 0 or lower. If the count has not reached 0 or lower, the procedure goes to step S19.

If the count has reached 0 or lower, then the procedure goes to step S18 to set (reset) the count to 47.

In step S19, the modulo-48 counter 71 determines whether or not load data has been inputted from the load terminal 71b. If no load data has been input, the procedure returns to step S11 to repeat the above-mentioned processes. If the load data has been input, then the procedure goes to step S20 to set the load data as a count value and then returns to step S11 to repeat the above-mentioned processes.

Thus, the count value of the modulo-48 counter 71 becomes the value which represents the relative position of 48 tracks constituting 3 ECC blocks. Namely, the count value of the modulo-48 counter 71 indicates the continuously obtained track pair numbers recorded on the magnetic tape 18 which are to be reproduced now by the rotary head 17.

The count value of the modulo-48 counter 61 to be outputted as a reference tracking phase is a value synchronized with a period of 3 ECC blocks (a value synchronized with the tracking phase of the magnetic tape 18); and, the virtual modulo-48 counter shown in FIG. 16 becomes a reference track number to be determined by drum rotational angle.

The phase comparator 53 sequentially compares the reference tracking phase (reference count value) input from the modulo-48 counter 61 of the reference phase generator 51 with the phase of the detected tracking information input from the modulo-48 counter of the track number detection processor 52 to generate a tape speed control signal on the basis of the comparison and supplies the generated signal to the capstan motor 20. Consequently, the tape travel speed of the magnetic tape 18 is controlled so that the value of the modulo-48 counter 61 and the value of the modulo-48 counter 71 match each other, thereby achieving tracking control.

As described above, in step S14, the value of the modulo-48 counter 71 of the track number detection processor 52 is set (or modified) appropriately on the basis of the reproduction data supplied from the magnetic tape 18, in order to execute the correct correlation with the recording track of the search data on the magnetic tape 18. The following describes this point further.

For example, when the recording/reproducing head traces the subcode area, the reproduction signal outputted from this recording/reproducing head has the noise eliminated from it by the noise eliminator 72, and the resultant signal is output to the recording/reproducing head SC phase converter 73. The recording/reproducing head SC phase converter 73 generates load data for the modulo-48 counter 71 from the modulo-3 phase and track pair number obtained from the subcode information reproduced by the recording/reproducing head, in accordance with equation (1) shown above. If the modulo-3 phase is "1", as shown in FIG. 16, the value of lower 3 bits of the track pair number 12 is 4 (=12−8), so that the ECC track number becomes 9 (=4×2+1) and the value of the load data becomes 25 (=(1×16)+(4×2)+1). This value is output to the load terminal 71c of the modulo-48 counter 71 to be loaded.

When, as the reproduction operation proceeds, the non-recording/reproducing head traces the subcode area, the reproduction signal output from this non-recording/reproducing head has the noise eliminated from it by the noise elimintor 72, and the resultant signal is outputted to the non-recording/reproducing SC phase converter 75. The non-recording/reproducing SC phase converter 75 generates the load data for the modulo-48 counter 71 from the modulo-3 phase and track pair number obtained from the subcode information reproduced by the non-recording/reproducing head, in accordance with equation (2) shown above. Namely, when the modulo-3 phase is "0" in the example shown in FIG. 16, the value of the lower 3 bits of the track pair number is "0", so that the ECC track number becomes 0 (=0×2) and the value of the load data becomes 0 (=0×16+ 0×2). This value is output to the load terminal 71c of the modulo-48 counter 71.

On the basis of the detected tracking information output from the modulo-48 counter 71, the locked track detector 91 detects whether or not the phase of the modulo-48 counter 71 is locking. If the search SBH detector 92 detects that, although the locked track has been detected by the lock detector 91 (count value of the modulo-48 counter 71 is 13), no 24-fold-speed search sync block header has been detected by the recording/reproducing head SD phase converter 74 for some reason, the search SBH detector 92 outputs the load data for shifting the locked phase by 16 tracks and causes the modulo-48 counter 71 to increment the count value by 16 to the load terminal 71c of the modulo-48 counter 71. If the 24-fold-speed search sync block header is not yet detected, the locked phase is further shifted by another 16 tracks. Thus, while the above-mentioned process is repeated twice, the recording phase of 3 ECC can be locked without failure.

The adder 102 of the correction block 79 computes a difference between the "(value obtained by doubling the value of the lower 3 bits of the track pair number)+1" output by the recording/reproducing head SD phase converter 74 or the "(value obtained by doubling the value of the lower 3 bits of the track pair number)+0" output from the non-recording/reproducing head SD phase converter 76 and the value of the lower 4 bits of the modulo-48 counter 71 and outputs the obtained difference to the adder 101. The adder 101 adds the difference supplied from the adder 102 to the output of the modulo-48 counter 71 and loads the result to the modulo-48 counter 71.

Thus, the value of the modulo-48 counter 71 is appropriately corrected to a correct value.

The switch 26 connects to the terminal b side (because the search mode is on in this case) to output the search video data from the variable-speed reproduction memory 25 to the decompression processor 27. The decompression processor 27 executes decompression on the search video data supplied through the switch 26 and outputs the decompressed search video data to a television receiver (not shown) via the D/A converter 28.

Thus, by assigning the modulo-3 counter to the reserved bit of the title time code in the subcode data, it is possible to configure a virtual modulo-48 counter. This configuration eliminates the necessity for the arrangement in the main sync block of a modulo-3 counter, which is otherwise necessary for recording the recording positional information of the search data for variable-speed reproduction.

Matching the arrangement pattern of the data for variable-speed reproduction with the interleave unit of error correction outer code allows a reduction in the scale of the hardware (namely the recording/reproducing apparatus) and, at the same time, mitigate the load of the software. Further, this can reduce the recording volume of the search data to ⅓, thereby assigning the saved recording volume to the main video rate.

The detected tracking information (search data recording phase) is updated by the acquisition information of all heads including the inverse azimuth head, so that the pull-in delay due to acquisition error can be minimized.

In addition, the error lock detector 78 is arranged so that, if a subcode can not be detected for some reason, tracking control can be executed still.

The above-mentioned sequence of processes also can be executed by software. The execution by software is supported by a computer in which the programs constituting the software are installed in a dedicated hardware device beforehand or by a general-purpose personal computer capable of executing various capabilities in which these programs are installed from the program storage medium.

The storage medium may be, other than a computer, a package medium for storing programs and for distributing the programs to the users constituted by the magnetic disk 31 or (including floppy disk), the optical disk 32 (including CD-ROM (compact Disk-Read Only Memory) and DVD (Digital Versatile Disk)), the magneto-optical disk 33 (including MD (Mini Disk)), or the semiconductor memory 34 as shown in FIG. 1.

It is to be noted that in the present specification, the steps describing the programs to be stored in the program storage medium are not only executed in a time-dependent manner in the order described but also in parallel or in a discrete manner.

While a preferred embodiment of the present invention has been described using specific terms, such description is for illustrative purposes only, and it is to be understood that changes and variations may be made without departing from the spirit or scope of the following claims.

What is claimed is:

1. A magnetic tape tracking control apparatus for controlling tracking of tracks on a magnetic tape by a rotary head, comprising:
    first image data generating means for encoding an inputted video signal to generate video data;
    second image data generating means for generating search video data on the basis of said video data generated by said first image data generating means;
    recording means for recording, on said tracks, said video data, said search video data, track number information and positional information associated with a recording position of said search video data, wherein said recording means records said video data and said search video data in a main area of said track with said track number information and records said positional information in a subcode area with said track number information;
    reference phase generating means for generating a reference phase in variable-speed reproduction;
    tracking information generating means for generating a tracking phase corresponding to a position of one of said tracks, recorded with search video data, wherein said tracking information generating means comprises:
        counting means for counting clocks,
        detecting means for detecting said search video data,
        error lock detecting means for determining whether the phase of said counting means is locked to a target track, and
        first setting means for setting said counting means by a count value corresponding to the track number information of said detected search video data; and
        comparing means for comparing said reference phase with said tracking phase to control tracking on the basis of a result of the comparison.

2. The magnetic tape tracking control apparatus according to claim 1, said rotary head comprising a first head capable of reproducing said search video data and a second head incapable of reproducing said search video data; said second generating means further comprising correcting means for correcting said counting means on the basis of a difference between an outputted count value of said counting means and the track number information from said subcode area reproduced from said magnetic tape through said second head.

3. The magnetic tape tracking control apparatus according to claim 1, wherein said second generating means further comprises correcting means for correcting said counting means on the basis of a difference between an outputted count value of said counting means and the track number information of said search video data.

4. A magnetic tape tracking control method for a magnetic tape tracking control apparatus for controlling tracking of tracks on a magnetic tape by a rotary head, comprising:

a first image data generating step for encoding an inputted video signal to generate said video data;

a second image data generating step for generating search video data on the basis of said video data generated in said first image data generating step;

a recording step for recording, on said tracks, said video data, said search video data, track number information and positional information associated with a recording position of said search video data, wherein said recording step records said video data and said search video data in a main area of said track with said track number information and records said positional information in a subcode area with said track number information;

generating a reference phase in variable-speed reproduction;

generating a tracking phase corresponding to a position of one of said tracks, recorded with search video data, wherein generating the tracking phase comprises:

a counting step for counting clocks;

a detecting step for detecting said search video data;

an error lock detecting step for determining whether the phase of said counting step is locked to a target track, and a first setting step for setting said counting step by a count value corresponding to the track number information of said detected search video data; and comparing said reference phase with said tracking phase to control tracking on the basis of a result of the comparison.

\* \* \* \* \*